United States Patent Office 3,697,450
Patented Oct. 10, 1972

3,697,450

PROCESS FOR PRODUCING RESISTANCE FILMS

Haruo Takenaka, Toshiaki Okiyama, and Nobuo Hiratsuka, Kanagawa, Japan, assignors to Fuji Photo Film Co., Ltd., Kanagawa, Japan

No Drawing. Filed June 23, 1969, Ser. No. 835,774
Claims priority, application Japan, June 22, 1968, 43/43,299
Int. Cl. H01b *1/06*
U.S. Cl. 252—511 10 Claims

ABSTRACT OF THE DISCLOSURE

A resistance film and process therefor, including forming a dispersion of (1) a solution of an organic solvent-soluble plastic of a softening point greater than 80° C., (2) a conductive substance having a volume resistivity of less than $10^{-1}\Omega$ cm. and (3) an inorganic silicon-containing material of a volume resistivity of more than $10^{-4}\Omega$ cm., casting a film of the dispersion, and drying the film.

BACKGROUND OF THE INVENTION

(1) Field of the invention

This invention relates to a process for producing resistance films, and especially to a process for producing resistance films by casting a solution of an organic solvent-soluble plastic having a softening point higher than 80° C. containing, uniformly dispersed therein, an electrically conductive substance having less than $10^{-1}\Omega$ cm. of volume resistivity at 20° C. such as carbon black, graphite and silver particles, and a silicon-containing inorganic material having more than $10^{-4}\Omega$ cm. of volume resistivity at 20° C.

(2) Description of the prior art

Generally, resistance films which are used for modulating volume, vertical-hold and contrast of televisions, volume of radios and tape recorders, and for meters are produced by spraying an electric conductive substance such as carbon black onto a phenol resin sheet or otherwise providing a coating of the substance. However, since the surfaces of these films are not flat, there are defects so that wear and tear of the control head is severe, noise easily results, current capacity is small (less than 0.5 w.), variation of resistivity is large, and, especially, change of resistivity by humidity is remarkably large.

SUMMARY OF THE INVENTION

The first object of this invention is to provide a resistance film containing an increased amount of electrically conductive substance whereby it is possible to lower the variation in resistivity, as well as to lower contact resistance by an increase in hardness of the films.

The second object of this invention is to provide a resistance film having a large current capacity, having a linear relationship between electrode-to-electrode distance and resistivity, and scarcely showing any change in resistivity due to the influence of humidity.

The third object of this invention is to provide resistance films having heat-resisting properties and durability.

The objects of this invention have been attained by providing a resistance film prepared by casting, on a support, a solution of an organic solvent-soluble high molecular weight resin having a softening point higher than 80° C. having uniformly dispersed therein 5–50% by weight, based on said resin, of an electrically conductive substance having less than $10^{-1}\Omega$ cm. of volume resistivity and 1–30% by weight, based on said resin, of a silicon-containing inorganic material having more than $10^{-4}\Omega$ cm. of volume resistivity.

DESCRIPTION OF THE INVENTION

The resistance films of this invention are produced by casting an organic solvent solution which is prepared by homogeneously dispersing an electrically conductive substance having less than $10^{-1}\Omega$ cm. of volume resistivity, such as carbon black, graphite, copper powder and silver powder, and an inorganic silicon containing material having more than $10^{-4}\Omega$ cm. of volume resistivity, such as Carborundum (trademark of silicon carbide produced by Carborundum Co., U.S.A.), silica, glass powder and stone powder, in a solution of an organic solvent-soluble resin having a softening point higher than 80° C., such as a polycarbonate, a cellulose ester, a polyphenylene-oxide, a polyimide, etc. It is possible to lower the variation of resistivity by increasing the amount of the electrically conductive substance and lowering the contact resistance by increasing the hardness of the film. However, in order to obtain a resistance film having a definite resistivity, for instance 5KΩ, as measured by a bridge or an ohmmeter, less than 5% of the electrically conductive substance is admixed, even if carbon black, which belongs to the member group having the highest resistivity, is used. However, the variation of the resistivity is improved by admixing carbon black or graphite in an amount of more than 5% by weight, based on the resin. Further, the contact resistance, and the variation in resistivity decrease as the hardness of the film increases.

The inventors have found that by admixing a silicon-containing inorganic material having more than $10^{-4}\Omega$ cm. of volume resistivity, for example, Carborundum, silica, glass powder and stone powder, etc., in a solution of a film-forming resin, an electrically conductive substance can be added in an amount higher than 5% by weight. By so doing, the hardness of film is increased and the variation in the resistivity is decreased.

Resistance films comprising an electrically conductive substance and an inorganic material containing silicon in cellulose triacetate resin (percent by weight based on resin) are shown in Table 1. The aim is to obtain 5K ohm of resistivity while using an ohmmeter to determine resistivity.

TABLE 1

| | Resistivity (Ω) | | Variation of resistivity | Contact resistance | Stiffness of film |
|---|---|---|---|---|---|
| Carbon black A: | | | | | |
| 5% | 6,100 | Bad | Worst | Worst | Worse. |
| 20% | 1,500 | Worse | Bad | Bad | Do. |
| 35% | 120 | do | Bad | Bad | Bad. |
| Carbon black B: | | | | | |
| 5% | 7,000 | Good | Worst | Worse | Worse. |
| 20% | 2,500 | Worse | Bad | Bad | Do. |
| 35% | 210 | do | Bad | Bad | Bad. |
| Carbon black C, 35%; Carborundum #50, 10% | 8,000 | Good | Good | Good | Good. |
| Carbon black A, 35%; Glass powder, 8% | 8,000 | do | do | do | Do. |
| Carbon black B, 35%; Silica, 7% | 8,000 | do | do | do | Do. |

As the resin having a sofening point of more than 80° C., used in this invention, there are polycarbonates, cellulose esters, polyphenylene oxides and polyimides. These resins are very useful as materials for resistance films because they all have properties satisfying the objects of this invention. That is, they are completely soluble in organic solvents, and have good heat resistance, low hydroscopic properties, and sufficient surface hardness. Resins other than those above are not preferred for the resin for resistance films because, for example, a film of polyvinyl chloride having a softening point of less than 80° C. is poor in heat resistance and films of polyethylene terephthalate and polypropylene are poor in solubility. As the electrically conductive substance dispersed in the resin, there are carbon black, graphite, copper powders, silver powders, etc. However, carbon black is most preferable because a large amount thereof can be homogeneously dispersed in the resin due to a small apparent density, and, further, it is inexpensive. The amount of the electrically conductive substance, such as carbon black, graphite, silver powder or copper powder, is preferably 5–50% by weight based on the resin. The volume resistivity of the resistance films is preferably $10^2$–$10^{10}\Omega$ cm. If the amount of the electrically conductive substance, such as graphite, carbon black or silver powder is over 50% by weight based on the resin, properties of the resistance films, such as flexibility and strength are lowered to an extent of making the film unsuitable for practical use. As the inorganic material containing silicon and having a high resistivity, there are Carborundum, silica, glass powder, stone powder, etc., and the preferable amount thereof is 1–30% by weight based on the resin. If the amount thereof is over 30% by weight, based on the resin, properties of the resistance films, such as strength and brittleness, are lowered and the films become unsuitable for use.

Since the resistance films of this invention are produced by a solution film-making method, that is, by casting film from a resin solution on a rotating support, flms having a uniform thickness and flat surface are obtainable. Further, since the electrically conductive substance and the inorganic material are homogeneously dispersed in the solution by mixing and blending, variations in resistivity are not observed.

Namely, the resistance films of this invention are produced as follows. After dissolving a plastic having a softening point higher than 80° C. in a solvent mixture, such as a chlorinated hydrocarbon; e.g., methylene chloride, ethylene chloride and trichloroethylene; and alcohol, e.g., methanol and ethanol; a ketone, e.g., acetone, methyl ethyl ketone and cyclohexanone; or an amide, e.g., dimethyl formamide and dimethyl acetamide, a plasticizer, such as triphenylphosphate or diethyl phthalate, if desired, is added to the solution. Then, an electrically conductive substance having less than $10^{-1}\Omega$ cm. of volume resistivity, such as, carbon black, graphite or silver powder, is added in the amount of 5–50% by weight based on the resin, and an inorganic silicon containing material having higher than $10^{-4}$ $\Omega$ cm. of volume resistivity, such as Carborundum, silica, glass powder or stone powder, is added to the solution in the amount of 1–30% by weight, based on the resin. After sufficiently blending the mixture by means of a dispersing machine, such as a ball mill or a sand mill, and filtering, the resin solution is allowed to flow on a moving support and dried to obtain the resistance film of this invention.

The resulting resistance film has preferred properties and is very useful, because, when it is used for modulating volume, tone and brightness of electric elements in televisions, radios, tape recorders and the like, there is no variation in the resistivity, the resistivity increased linearly as the distance between electrodes increases, noise does not result, change of the resistivity by humidity is hardly observed, current capacity is large (over 2 w.), surface hardness of the film is excellent, and durability of the film is sufficiently large since the whole film is a resistor.

This invention will be explained concretely by the following examples. All parts in the following are by weight.

EXAMPLE I 450 parts of methylene chloride, 50 parts of methanol, and 15 parts of triphenyl phosphate were dissolved in 100 parts of cellulose triacetate flake (60.8% of acetylation value) by stirring. Into this solution, 35 parts of carbon #100, having $7.0\times10^{-3}\Omega$ cm. of volume resistivity (produced by Mitsubishi Chemical Industries, Ltd.) and 10 parts of Carborundum having $2.1\times10^2\Omega$ cm. of volume resistivity were added. The mixture was then blended for 30 hours in a ball mill. This solution was allowed to flow onto a rotating support to form a film of 300$\mu$ in thickness, after drying.

The volume resistivity of this resulting resistance film was $3.5\times10^4\Omega$ cm. When this film was used as the resistance film of a radio, tape recorder or the like, the film showed excellent properties and there was no variation in the resistivity, the resistivity linearly increased with an increase in distance between electrodes, the change of the resistivity by humidity was hardly observed, the current capacity was excellent (over about 2 w.), and the film endured use for a long period of time, since the surface hardness was high.

EXAMPLE II

After adding 500 parts of methylene chloride to 100 parts of a polycarbonate resin, the mixture was stirred to dissolve the resin. Into this solution, 35 parts of carbon black having $1.42\times10^{-3}\Omega$ cm. of volume resistivity and 8 parts of glass powders were added. The mixture was blended for 40 hours in a ball mill. The resulting solution was allowed to flow onto a rotating support to form a film having a dried thickness of 350$\mu$. The volume resistivity of the thus resulting resistance film was $3.1\times10^4\Omega$ cm. This resistance film had the same excellent properties as those in Example I.

EXAMPLE III

After adding 500 parts of methylene chloride to 100 parts of a polyphenylene oxide resin, the mixture was stirred to facilitate dissolution. Into this solution, 35 parts of carbon black having $4.1\times10^{-3}\Omega$ cm. of volume resistivity, and 7 parts of silica having $8.2\times10^7\Omega$ cm. of volume resistivity were added. The mixture was blended for 40 hours in a ball mill. The resulting solution was allowed to flow onto a rotating support to form a film having a dried thickness of 250$\mu$. The volume resistivity of thus resulting resistance film was $1.2\times10^5\Omega$ cm. This resistance film had the same excellent properties as in Example I.

EXAMPLE IV

After adding 600 parts of dimethyl acetamide to 100 parts of a polyimide resin, the mixture was stirred to dissolve the resin. Into this solution, 40 parts of carbon black, having $1.8\times10^{-4}\Omega$ cm. of volume resistivity, and 10 parts of Carborundum, having $120\Omega$ cm. of volume resistivity, were added. The mixture was blended for 1 hour by an attriter. This solution was allowed to flow onto a rotating support to form a film having a dried thickness of 300$\mu$. The volume resistivity of the thus resulting resistance film was $2\times10^4\Omega$ cm. This film had the same excellent properties as in Example I.

EXAMPLE V

A resistance film was produced by the same procedure as in Example I, but 20 parts of carbon black and 10 parts of graphite were used instead of the carbon black in Example I. The volume resistivity was $9.2\times10^3\Omega$ cm. The film had the same excellent properties as in Example I.

EXAMPLE VI

A resistance film was produced by the same procedure as in Example II, but 30 parts of carbon black and 5 parts of a silver powder were used instead of the carbon black in Example II. The volume resistivity of this resistance film was $5\times10^3\Omega$ cm. This film had the same excellent properties as in Example I.

What is claimed is:

1. A process for the production of a resistance film having a volume resistivity of from $10^2$ to $10^{10}$ ohm-cm. comprising:

(a) forming a dispersion, in an organic solvent solution of an organic solvent-soluble plastic having a softening point of higher than 80° C. selected from the group consisting of polycarbonates, cellulose esters, polyphenylene oxides and polyimides, of from 5 to 50% by weight, based on the weight of said plastic, of an electrically conductive substance having a volume resistivity of less than $10^{-1}$ ohm-cm. at 20° C. and from 1 to 30% by weight, based on the weight of said plastic, of an inorganic silicon-containing material having a volume resistivity of greater than $10^{-4}$ ohm-cm. at 20° C.;

(b) forming a film of the resulting dispersion by casting said dispersion onto a rotating support; and (c) drying said film.

2. The process as claimed in claim 1, wherein said silicon-containing inorganic material is selected from the group consisting of Carborundum, silica, glass powders, and stone powders.

3. The process as claimed in claim 1, wherein said electrically conductive substance is selected from the group consisting of carbon black, graphite, copper powders, and silver powders.

4. The resistance film produced by the process of claim 1.

5. The process of claim 1 wherein said electrically conductive substance is carbon black.

6. The process of claim 1 wherein said dispersion is formed by dissolving said plastic in a solvent selected from the group consisting of a chlorinated hydrocarbon, an alcohol, a ketone, an amide and mixtures thereof, together with a plasticizer, and then adding said electrically conductive substance and said inorganic silicon-containing material thereto and then blending the resulting mixture to form said dispersion.

7. The process of claim 6 wherein said chlorinated hydrocarbon is methylene chloride, ethylene chloride or trichloroethylene; wherein said alcohol is methanol or ethanol; wherein said ketone is acetone, methyl ethyl ketone or cyclohexanone; wherein said amide is dimethylformamide or dimethylacetamide; and wherein said plasticizer is triphenylphosphate or diethylphthalate.

8. A process for the production of a resistance film having a volume resistivity of from $10^2$ to $10^{10}$ ohm-cm. consisting of:

(a) forming a dispersion, in an organic solvent solution of an organic solvent-soluble plastic having a softening point of higher than 80° C., of from 5 to 50% by weight, based on the weight of said plastic, of an electrically conductive substance having a volume resistivity of less than $10^{-1}$ ohm-cm. at 20° C. and from 1 to 30% by weight, based on the weight of said plastic, of an inorganic silicon-containing material having a volume resistivity of greater than $10^{-4}$ ohm-cm. at 20° C.;

(b) forming a film of the resulting dispersion by casting said dispersion onto a rotating support; and (c) drying said film.

9. The process of claim 8 wherein said organic solvent-soluble plastic is selected only from the group consisting of polycarbonates, cellulose esters, polyphenylene oxides and polyimides.

10. The process of claim 8 wherein said organic solvent-soluble plastic contains a plasticizer.

References Cited

UNITED STATES PATENTS

| | | | |
|---|---|---|---|
| 2,282,832 | 5/1942 | Spooner | 252—510 |
| 3,507,951 | 4/1970 | Morecroft et al. | 260—37 PC |
| 3,444,183 | 5/1969 | Hubbuch | 252—511 |
| 3,457,537 | 7/1969 | Hines | 252—511 |
| 3,571,777 | 3/1971 | Tully | 252—511 |
| 1,983,267 | 12/1934 | Browne et al. | 252—511 |
| 2,526,059 | 10/1950 | Zabel et al. | 252—511 |
| 2,795,680 | 6/1957 | Peck | 252—511 |
| 3,002,862 | 10/1961 | Smith-Johannsen | 252—511 |
| 3,089,849 | 5/1963 | Linson | 252—511 |
| 3,301,707 | 1/1967 | Loeb et al. | 252—511 |
| 3,382,574 | 5/1968 | Chadwick | 252—511 |

DOUGLAS J. DRUMMOND, Primary Examiner